(12) United States Patent
Smith

(10) Patent No.: US 6,667,068 B2
(45) Date of Patent: Dec. 23, 2003

(54) METHOD FOR PREPARING SOLID MILK PRODUCT

(75) Inventor: Gary Francis Smith, Highland Park, IL (US)

(73) Assignee: Kraft Foods Holdings, Inc., Northfield, IL (US)

(*) Notice: Subject to any disclaimer, the term of this patent is extended or adjusted under 35 U.S.C. 154(b) by 0 days.

(21) Appl. No.: 09/992,912

(22) Filed: Nov. 14, 2001

(65) Prior Publication Data

US 2002/0146500 A1 Oct. 10, 2002

Related U.S. Application Data

(63) Continuation-in-part of application No. 09/771,858, filed on Jan. 29, 2001, now abandoned.

(51) Int. Cl.$^7$ .................................................. A23C 9/00
(52) U.S. Cl. ........................ 426/580; 426/522; 426/585
(58) Field of Search ................................ 426/580, 585, 426/586, 587, 588, 657, 601, 519, 520, 521, 522

(56) References Cited

U.S. PATENT DOCUMENTS

| | | |
|---|---|---|
| 3,903,308 A | 9/1975 | Ode |
| 4,298,625 A | 11/1981 | Cillario |
| 4,497,834 A | 2/1985 | Barta |
| 4,565,702 A | 1/1986 | Morley et al. |
| 4,619,831 A | 10/1986 | Sharma |
| 4,673,578 A | 6/1987 | Becker et al. |
| 4,759,940 A | 7/1988 | Cattaneo et al. |
| 5,320,859 A | 6/1994 | Namdari |
| 5,520,946 A | 5/1996 | Chablaix et al. |
| 6,117,478 A | 9/2000 | Dubberke |

FOREIGN PATENT DOCUMENTS

| | | |
|---|---|---|
| EP | 938848 A1 * | 9/1999 |
| JP | HEI 8-112062 | 5/1996 |
| WO | WO 99/11147 A1 | 3/1999 |
| WO | WO 00/56171 A1 | 9/2000 |
| WO | WO 00/56174 A1 | 9/2000 |

* cited by examiner

*Primary Examiner*—Leslie Wong
(74) *Attorney, Agent, or Firm*—Fitch, Even, Tabin & Flannery

(57) ABSTRACT

The present invention provides a method of preparing a solid milk product having a moisture level of less than about 40 percent and a fat/protein ratio of less than about 2.5, and preferably a moisture level of about 10 to about 30 percent and a fat/protein ratio of less than about 2. More preferably, the solid milk product has a fat/protein ratio of about 0.5 to about 1.5 and, even more preferably, about 1 to about 1.2. The present solid milk product is a high solids, low moisture, high-protein, shelf-stable milk product which is solid at ambient temperatures. Solid milk products containing solid ingredients (e.g., cereals, grains, cookies, trail mix, dried fruits, nuts, and mixtures thereof) may also be prepared.

58 Claims, 3 Drawing Sheets

METHOD FOR PREPARING SOLID MILK PRODUCT

RELATED APPLICATION

The present application is a continuation-in-part of U.S. patent application Ser. No. 09/771,858 filed on Jan. 29, 2001, now abandoned.

FIELD OF THE INVENTION

The present invention generally relates to a method for preparing a solid milk product. More specifically, the present invention relates to a process for preparing a solid milk product having a moisture level of less than about 40 percent and a fat/protein ratio of less than about 2.5. The present invention also relates to a solid milk product which is a solid at ambient temperatures, has a moisture level of less than about 40 percent, and has a fat/protein ratio of less than about 2.5.

BACKGROUND OF THE INVENTION

Dairy products such as liquid milk which are high in protein can form an important part of a nutritious diet. Unfortunately, many people do not generally consume liquid milk in sufficient quantities for a number of reasons. Thus, there has been considerable effort to prepare milk-based products in solid form which are more convenient to consume.

Barta, U.S. Pat. No. 4,497,834 (Feb. 5, 1985) provided a simplified process for preparing a nutritious dairy-based product. This process involved condensing fatted or defatted milk to essentially the solids and moisture content desired in the final product, reducing the lactose content to below about 15 percent, and then cooking the mixture to produce, upon cooling, a gel-like material. If desired, fat could be added to a level of about 5 to 40 percent. The moisture content of the gel-like material was generally less than about 50 percent. However, to achieve low moisture levels, Barta was required to add significant levels of fat. Based on the reported examples in Barta, for example, a 48 percent moisture level product would have a fat/protein ratio of about 1.1; a 30 percent moisture level product would have a fat/protein ratio of about 6.2; and a 15 percent moisture level product would have a fat/protein ratio of about 19.6. Thus, Barta was only able to obtain relatively low moisture levels by significantly increasing the fat/protein ratios. Of course, such high fat/protein ratios result in a less desirable high-fat product, thereby significantly reducing the nutritional characteristics of the product.

Cillario, U.S. Pat. No. 4,298,625 (Nov. 3, 1981) provided a low moisture foam consisting of an oil-in-water emulsion prepared from edible fat, milk proteins, water, and optionally added sugars. Cillario was able to produce both "creamy" (i.e., viscosity of about 400,000 cps) and "paste-like (i.e., viscosity of about 3,500,00 cps) products with moisture levels of about 17 to about 35 percent. Fat/protein ratios for both the creamy and paste-like products generally ranged from about 3.9 to about 12, with the "optimum" ratios reported at about 7 to about 7.5. Of course, such high fat/protein ratios result in a less desirable high-fat product, thereby significantly reducing the nutritional characteristics of the product.

It would be desirable, therefore, to produce solid milk products having low moisture levels as well as low fat/protein ratios. The present invention provides such solid milk products and methods for producing such solid milk products.

SUMMARY OF THE INVENTION

The present invention provides a method of preparing a solid milk product having a moisture level of less than about 40 percent and a fat/protein ratio of less than about 2.5, and preferably a moisture level of about 10 to about 30 percent and a fat/protein ratio of less than about 2.0. More preferably, the solid milk product has a fat/protein ratio of about 0.5 to about 1.5 and, even more preferably, about 1 to about 1.2. Generally, the solid milk product of the present invention has less than about 50 percent added sweetener (e.g., sugar), preferably about 12 to about 35 percent added sweetener, and more preferably about 25 to about 35 percent added sweetener. Generally, the total sweetener (i.e., added sweetener plus sugars added with other ingredients) is less than about 57 percent, preferably about 25 to about 52 percent, and more preferably about 25 to about 40 percent.

The present solid milk product is a high solids, low moisture, high-protein, shelf-stable milk product which is solid at ambient temperatures.

Thus, the present product can be conveniently transported and consumed by hand. Moreover, the present product can be produced in various forms—for example, solid bars, candy-type bars, cookies, cookies or bars with other ingredients (e.g., granola, grains, peanuts, other nuts, chocolate bits or chips, and the like), bite-sized forms or pieces, enrobed solid forms (e.g., coated with yogurt, yogurt-coated raisins, chocolate, and the like), shapes (e.g., animal, stars, letters), and the like—and can be produced with varying levels of sweetness. The present product can also be produced in an aerated form.

The present invention provides a method for preparing a solid milk product, said method comprising:

(1) blending an aqueous liquid, an edible fat, and concentrated milk protein source at a temperature of about 40 to about 95° C. and under high shear conditions with a bulk peak shear rate of greater than about 950 sec$^{-1}$ to form a first blend, wherein the blending continues until essentially all components in the first blend are hydrated and wherein the edible fat has a melting point less than about 50° C;

(2) adding 0 to 1 percent of an emulsifier to the first blend either before or after essentially all components in the first blend are hydrated;

(3) adding, once essentially all components in the first blend are hydrated, 0 to about 3 percent of an emulsifying salt and 0 to about 1 percent $TiO_2$ to form a second blend;

(4) continuing to heat the second blend to the temperature of about 65 to about 95° C. under the high shear conditions until a homogeneous paste is obtained;

(5) pasteurizing the homogenous paste; and (6) cooling the pasteurized homogenous paste to form the solid milk product, wherein the relative amount of the aqueous liquid, the edible fat, and the concentrated milk protein source in the first blend are adjusted such that the solid milk product has a moisture level of less than about 40 percent and a fat/protein ratio of less than about 2.5 and wherein the solid milk product is a solid at ambient temperatures.

The present invention also provides a method for preparing a solid milk product having a moisture level of less than about 40 percent, said method comprising:

(1) blending an aqueous liquid, an edible fat, and concentrated milk protein source at a temperature of about 40 to about 95° C. and under high shear conditions with a bulk peak shear rate of greater than about 950 sec$^{-1}$ to form a first blend, wherein the blending continues until essentially all components in the first blend are hydrated and wherein the edible fat has a melting point less than about 50° C.;

(2) adding 0 to about 1 percent of an emulsifier to the first blend either before or after essentially all components in the first blend are hydrated;

(3) added 0 to about 3 percent of an emulsifying salt and 0 to about 1 percent TiO$_2$ to the first blend to form a second blend; wherein, if the moisture level of the solid milk product is to be greater than about 25 percent, the emulsifying salt and the TiO$_2$ are added to the first blend either before or after essentially all components in the first blend are hydrated; and wherein, if the moisture level of the solid milk product is to be less than about 25 percent, the emulsifying salt and the TiO$_2$ are added to the first blend after essentially all components in the first blend are hydrated;

(4) continuing to heat the second blend to the temperature of about 65 to about 95° C. under the high shear conditions until a homogeneous paste is obtained;

(5) pasteurizing the homogenous paste; and (6) cooling the pasteurized homogenous paste to form the solid milk product, wherein the relative amount of the aqueous liquid, the edible fat, and the concentrated milk protein source in the first blend are adjusted such that the solid milk product has a moisture level of less than about 40 percent and a fat/protein ratio of less than about 2.5; and wherein the solid milk product is a solid at ambient temperatures.

In a preferred embodiment, the present invention provides a method for preparing a solid milk product, said method comprising:

(1) blending about 20 to about 50 percent condensed fat-free milk or sweetened condensed fat-free milk, about 10 to about 35 percent anhydrous milkfat, and about 8 to about 30 percent concentrated dry milk powder at a temperature of about 40 to about 95° C. to form a first blend, wherein the blending continues until essentially all components in the first blend are hydrated;

(2) heating the first blend to a temperature of about 60 to about 95° C. under high shear conditions with a bulk peak shear rate of greater than about 950 sec$^{-1}$;

(3) adding 0 to 1 percent of an emulsifier to the first blend either before or after essentially all components in the first blend are hydrated;

(4) adding, once essentially all components in the first blend are hydrated, about 1 to about 3 percent of an emulsifying salt and about 0.4 to about 1 percent TiO$_2$ to the first blend to form a second blend;

(5) continuing to heat the second blend to the temperature of about 65 to about 95° C. under the high shear conditions until a homogeneous paste is obtained;

(6) pasteurizing the homogenous paste; and (7) cooling the pasteurized homogenous paste to form the solid milk product, wherein the solid milk product is a solid at ambient temperatures, has a moisture level of less than about 40 percent, and has a fat/protein ratio of less than about 2.5.

The present invention also provides a method for preparing a solid milk product, said method comprising:

blending an aqueous liquid, an edible fat, and concentrated milk protein source under moderate shear conditions with a bulk peak shear rate of greater than about 500 sec$^{-1}$ to form a first blend, wherein the blending continues until essentially all components in the first blend are hydrated and wherein the edible fat has a melting point less than about 50° C.;

(2) adding 0 to 1 percent of an emulsifier to the first blend either before or after essentially all components in the first blend are hydrated;

(3) adding, once essentially all components in the first blend are hydrated, 0 to about 3 percent of an emulsifying salt and 0 to about 1 percent TiO$_2$ to form a second blend;

(4) heating the second blend to the temperature of about 65 to about 95° C. under low to high shear conditions until a homogeneous paste is obtained;

(5) pasteurizing the homogenous paste; and (6) cooling the pasteurized homogenous paste to form the solid milk product, wherein the relative amount of the aqueous liquid, the edible fat, and the concentrated milk protein source in the first blend are adjusted such that the solid milk product has a moisture level of less than about 40 percent and a fat/protein ratio of less than about 2.5 and wherein the solid milk product is a solid at ambient temperatures.

The present invention also provides a solid milk product comprising about 15 to about 60 percent of an aqueous liquid (preferably condensed fat-free milk or sweetened condensed fat-free milk); about 8 to about 40 percent of an edible fat (preferably anhydrous milkfat); about 1 to about 45 percent of a concentrated milk protein source (preferably concentrated dry milk powder); 0 to about 3 percent of an emulsifying salt; 0 to about 1 percent TiO$_2$; 0 to 1 percent of an emulsifier; and 0 to about 50 percent non-lactose sweetener, wherein the solid milk product is a solid at ambient temperatures, has a moisture level of less than about 40 percent, and has a fat/protein ratio of less than about 2.5. Preferably, the solid milk product has a moisture level of about 10 to about 30 percent and a fat/protein ratio of less than about 2. More preferably, the solid milk product has a fat/protein ratio of about 0.5 to about 1.5 and, even more preferably, about 1 to about 1.2.

Although the above-described methods provide excellent solid milk products, we have now discovered an even simpler production method which eliminates some of the heating steps and the use of high shear mixing. This simplified method is especially adapted for preparing solid ingredient-containing solid milk bars. Suitable solid ingredients for use in the present invention include cereals, cookies, trail mix, dried fruits, nuts, and the like as well as mixtures thereof. The present invention provides a simplified method for preparing a solid ingredient-containing solid milk product, said method comprising:

(1) blending an aqueous liquid, an edible fat, and concentrated milk protein source under low to moderate shear conditions to form a first blend, wherein the blending continues until essentially all components in the first blend are hydrated and the first blend forms a sticky white mass and wherein the edible fat has a melting point less than about 50° C.;

(2) adding an emulsifying salt to the first blend either before or after essentially all components in the first blend are hydrated, (3) adding sugar to the first blend either before or after essentially all components in the first blend are hydrated;

(4) adding a solid ingredient to the sticky white mass to form a solid ingredient and first blend mixture;

(5) blending the solid ingredient and first blend mixture under low shear conditions until the solid ingredient is coated with the first blend to form a second blend;

(6) placing the second blend into a container;

(7) baking the second blend in the container; and (8) cooling the baked second blend to form the solid ingredient-containing solid milk product, wherein the relative amounts of the aqueous liquid, the edible fat, the emulsifying salt, and the concentrated milk protein source in the first blend are adjusted such that the solid ingredient-containing solid milk product has a moisture level of less than about 40 percent and a fat/protein ratio of less than about 2.5 and wherein the solid ingredient-containing solid milk product is a solid at ambient temperatures.

DETAILED DESCRIPTION OF THE INVENTION

The present invention provides a method of preparing a solid milk product having a moisture level of less than about 40 percent and a fat/protein ratio of less than about 2.5, and preferably a moisture level of about 10 to about 30 percent and a fat/protein ratio of less than about 2. More preferably, the solid milk product has a fat/protein ratio about 0.5 to about 1.5 and, even more preferably, about 1 to about 1.2. The present solid milk product is a high solids, low moisture, high-protein, shelf-stable milk product which is solid at ambient temperatures. Thus, the present product can be conveniently transported and consumed by hand. Moreover, the present product can be produced in various forms—for example, solid bars, candy-type bars, cookies, cookies or bars with other ingredients (e.g., granola, grains, peanuts, other nuts, chocolate bits or chips, and the like), bite-sized forms or pieces, enrobed solid forms, shapes (e.g., animal, stars, letters), and the like—and can be produced with varying levels of sweetness. The present product can also be produced in an aerated form.

The solid milk product of the present invention contains an aqueous liquid; an edible fat; a concentrated milk protein source; 0 to about 3 percent of an emulsifying salt; 0 to about 1 percent $TiO_2$; 0 to 1 percent of an emulsifier; and 0 to about 50 percent non-lactose sweetener, wherein the solid milk product is a solid at ambient temperatures, has a moisture level of less than about 40 percent and has a fat/protein ratio of less than about 2.5. Preferably, the solid milk product has a moisture level of about 10 to about 30 percent and a fat/protein ratio of less than about 2. More preferably, the solid milk product has a fat/protein ratio of about 0.5 to about 1.5 and, even more preferably, about 1 to about 1.2. Suitable emulsifying salts include, for example, sodium citrate, potassium citrate, monosodium phosphate, disodium phosphate, trisodium phosphate, sodium aluminum phosphate, sodium tripolyphosphate, sodium hexametaphosphate, dipotassium phosphate, sodium acid pryrophosphate, and the like, as well as mixtures thereof. Sodium citrate, disodium phosphate, or mixtures thereof are the preferred emulsifying salts. Suitable emulsifiers include, for example, monoglycerides, diglycerides, polysorbates, sodium stearoyl lactylate, lecithin, and mixtures thereof as well as the like. Monoglycerides, diglycerides, sodium stearoyl lactylate, and mixtures thereof are the preferred emulsifiers. Preferably such emulsifiers are used in aerated solid milk products to improve the aeration process.

Figure 1:
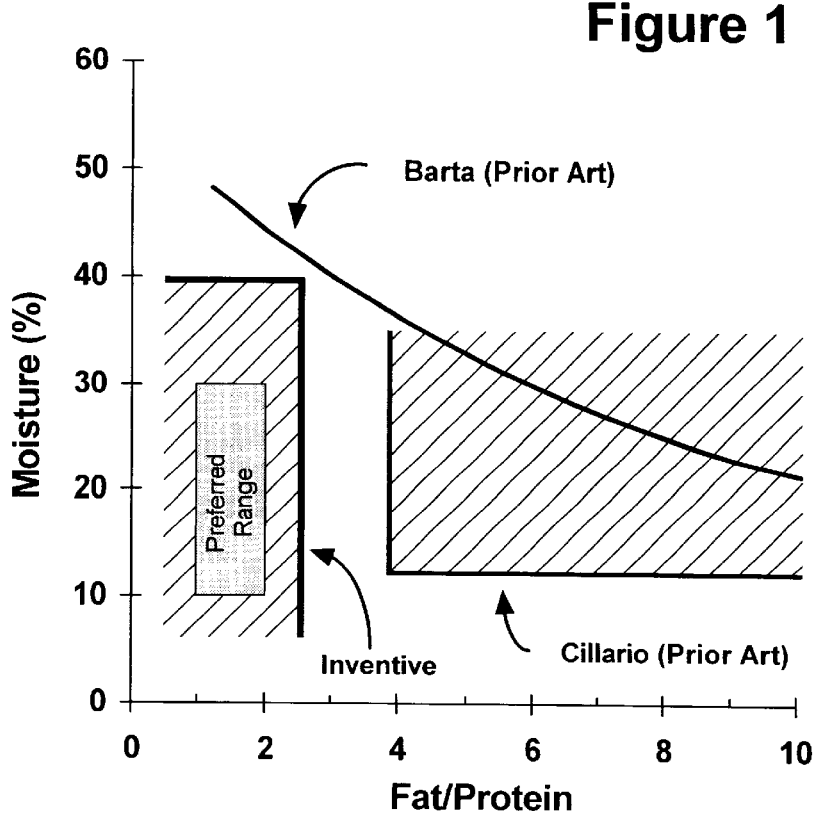
FIG. 1 provides a plot of moisture content versus fat/protein ratio comparing the solid milk product of the present invention with prior art products (i.e., Barta, U.S. Pat. No. 4,497,834 (Feb. 5, 1985) and Cillario, U.S. Pat. No. 4,298,625 (Nov. 3, 1981)).

FIG. 1 illustrates the relationship of the moisture level and the fat/protein level in the present solid milk product. Also included in FIG. 1 are several prior art products which generally have significantly higher moisture levels and/or fat/protein ratios; these prior art products are described in the Background of the Invention above. Cross-hatching in FIG. 1 generally indicates ranges of moisture and fat/protein ratio values for the specific products. As shown in FIG. 1, the prior art has not been able to produce solid milk products having low moisture levels coupled with low fat/protein ratios as provided by the present invention.

A preferred solid milk product of the present invention contains about 20 to about 50 percent of an aqueous liquid (preferably condensed fat-free milk or sweetened condensed fat-free milk); about 10 to about 35 percent of an edible fat (preferably anhydrous milkfat); about 8 to about 30 percent of a concentrated milk protein source (preferably concentrated dry milk powder); 0 to about 3 percent of an emulsifying salt (preferably sodium citrate, disodium phosphate, or mixtures thereof); 0 to about 1 percent $TiO_2$; 0 to 1 percent emulsifier; and 0 to 50 percent non-lactose sweeteners. Typical formulations for the preferred solid milk product are provided in the following table:

| Component | General Range (%) | Preferred Range (%) | More Preferred Range (%) |
|---|---|---|---|
| Condensed Milk | 15–60 | 20–50 | 25–40 |
| Anhydrous Milkfat | 8–40 | 10–35 | 14–20 |
| Concentrated Dry Milk Powder | 1–45 | 8–30 | 12–25 |
| Emulsifying Salts | 0–3 | 1–2.5 | 1.5–2.5 |
| $TiO_2$ | 0–1 | 0.4–0.9 | 0.7–0.9 |
| Emulsifiers | 0–1 | 0.05–0.7 | 0.15–0.4 |
| Added Sweetener (non-lactose) | 0–50 | 12–35 | 25–35 |

Suitable emulsifying salts include, for example, sodium citrate, potassium citrate, monosodium phosphate, disodium phosphate, trisodium phosphate, sodium aluminum phosphate, sodium tripolyphosphate, sodium hexametaphosphate, dipotassium phosphate, sodium acid pryrophosphate, and the like, as well as mixtures thereof. Sodium citrate, disodium phosphate, or mixtures thereof are the preferred emulsifying salts. Suitable emulsifiers include, for example, monoglycerides, diglycerides, polysorbates, sodium stearoyl lactylate, lecithin, and mixtures thereof as well as the like. Monoglycerides, diglycerides, sodium stearoyl lactylate, and mixtures thereof are the preferred emulsifiers. Preferably such emulsifiers are used in aerated solid milk products. Suitable non-lactose sweeteners include, for example, sucrose, dextrose, fructose, glucose, maltose, honey, corn syrup, non-nutritive sweeteners, and the like. Sucrose is generally preferred.

The solid milk products of this invention are solid at ambient temperatures (i.e., about 22 to about 25° C.), have moisture levels of less than about 40 percent, and have fat/protein ratios of less than about 2.5. Preferably, the solid milk products have moisture levels of about 10 to about 30 percent and a fat/protein ratio of less than about 2. More preferably, the solid milk product has a fat/protein ratio of about 0.5 to about 1.5 and, even more preferably, about 1 to about 1.2. Generally, the firmness or penetration of the unaerated solid milk product of this invention is greater than about 150 grams force, preferably about 150 to about 15,000 grams force, and more preferably about 1000 to about 10,000 grams force. Firmness can be measured using a universal testing machine in the penetration mode (e.g., Texture Technologies TA-XT2 using a 45° conical probe) or similar testing equipment. Generally, the overrun of the aerated solid milk product of this invention is about 5 to about 100 percent and more preferably about 15 to about 60 percent. Aerated solid milk products preferably contain about 0.05 to about 0.7 percent emulsifier, and more preferably about 0.15 to about 0.4 percent emulsifier. The solid milk products of the present invention are shelf stable. Generally, the solid milk products have shelf-lives of at least about 3 months under ambient, non-refrigeration conditions and of at least about 7 months under refrigeration conditions.

Figure 2:
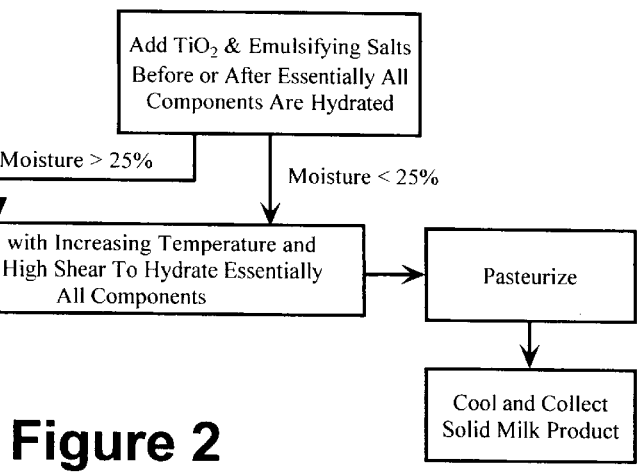
FIG. 2 is a flowchart illustrating the general process of the present invention. For solid milk products having a moisture level of greater than about 25 percent, the $TiO_2$ and emulsifying salts can be added either before or after essentially all components are hydrated. For solid milk products having a moisture level of less than about 25 percent, the $TiO_2$ and emulsifying salts should be added after essentially all components are hydrated.

FIG. 2 illustrates a general process for preparing the solid milk product of the present invention. As shown in FIG. 2, an aqueous liquid, an edible fat, and concentrated milk protein source are blended together. The relative amounts of the aqueous liquid, the edible fat, and concentrated milk protein source are adjusted to provide the desired moisture and fat/protein ratio in the solid milk product (i.e., moisture levels of less than about 40 percent, preferably about 10 to about 30 percent, and fat/protein ratios of less than about 2.5, preferably less than about 2, more preferably about 0.5 to about 1.5 and even more preferably about 1 to about 1.2). Suitable aqueous liquids include, for example, water, flavored water, fruit juice, liquid fruit concentrate, condensed milk, sweetened condensed milk, condensed fat-free milk, sweetened condensed fat-free milk, ultrafiltered milk, ultrafiltered skim milk, ultrafiltered/diafiltered milk, ultrafiltered/diafiltered skim milk, and mixtures thereof as well as the like. Preferably, the aqueous liquid is condensed milk, sweetened condensed milk, condensed fat-free milk, sweetened condensed fat-free milk, ultrafiltered milk, or ultrafiltered skim milk. More preferably, the aqueous liquid is condensed milk or condensed fat-free milk having about 30 to about 35 percent solids or sweetened condensed milk or fat-free sweetened condensed milk having about 70 to about 75 percent solids. More preferably, the sweetened condensed milk contains about 10 to about 50 percent sweetener selected from the group consisting of sucrose, dextrose, fructose, glucose, maltose, and non-nutritive sweeteners. The preferred sweetener is sucrose. The added sugars or sweeteners can be added separately or via the sweetened condensed milk. Preferably the sweeteners are added via the sweetened condensed milks. If added as a separate component, they are preferably added at the same time as the initial components.

Suitable edible fats include, for example, butter, cream, anhydrous milkfat, vegetable fats, coco butter, and mixtures thereof as well as the like. The edible fat should generally have a melting point less than about 50° C.; more preferably, the edible fat has a melting point of about 35 to about 45° C. Preferably the edible fat is anhydrous milkfat. Preferably, the edible fat is melted prior to incorporation in the composition. Suitable concentrated milk protein sources include, for example, non-fat dry milk powder, milk protein concentrate, ultrafiltered milk protein concentrate, ultrafiltered/diafiltered milk protein concentrate, ultrafiltered milk protein paste, ultrafiltered/diafiltered milk protein paste, whey protein concentrate, caseinates, and mixtures thereof as well as the like. Generally, the concentrated milk protein source is a dry powder having about 40 to about 92 percent milk protein and, more preferably, about 65 to about 85 milk protein. Preferred concentrated milk protein sources are concentrated dry milk powders such as, for example, non-fat dry milk powders and dry milk protein concentrate powders. The most preferred concentrated milk protein source is dry milk protein concentrate powder because of its generally low lactose level. It is generally preferred that the lactose in the moisture phase of the solid milk product (as measured by lactose (%)/moisture (%)×100) of the present invention is below about 19 percent and more preferably below about 16 percent. If desired, the desired relatively low lactose levels can be obtained by using components having low levels of lactose (e.g., ultrafiltered or, ultrafiltered/diafiltered milk components) or by treatment of one or more of the components or the sold milk product itself with, for example, an enzyme (e.g., lactase) to reduce the lactose levels.

The initial components (i.e., aqueous liquid, edible fat, and concentrated milk protein source) are blended with increasing temperature under high shear conditions in order to hydrate essentially all lactose in the composition. For purposes of this invention, "high shear conditions" require a bulk peak shear of greater than about 950 $sec^{-1}$; preferably the bulk peak shear is about 1000 to about 10,000 $sec^-$. Blending with high shear continues until a homogenous paste is formed with essentially all components, including any lactose that may be present, are hydrated. For purposes of this invention, "essentially all components are hydrated" requires that at least 90 percent, and more preferably at least about 95 percent, of the components, including lactose that may be present in the composition, are hydrated. As those skilled in the art will realize, the time required to obtain essentially complete hydration will vary depending on the relative amounts of the components, the amount of water present, and mixing conditions (e.g., applied shear and temperature). Generally, a mixing time of about 1 to 10 minutes at a temperature of about 70 to about 75° C. under high shear conditions is sufficient. In cases where sufficient hydration has not occurred, the low moisture solid milk product will tend to be "gritty." Of course, if such a gritty product is obtained, the blending or mixing time and/or the blending or mixing temperature can be increased.

Optional functional ingredients can be, and preferably are, incorporated into the solid milk products of this invention. These functional ingredients include emulsifying salts (preferably sodium citrate, disodium phosphate, and mixtures thereof), $TiO_2$, and, especially for aerated solid milk products, one or more emulsifiers such as monoglycerides, diglycerides, polysorbates, sodium stearoyl lactylate, and lecithin. Preferably at least one of these optional ingredients is incorporated into the compositions of this invention; more preferably, at least two of these optional ingredients are incorporated; even more preferably, especially if aerated solid milk products are desired, all of these just-listed optional ingredients are incorporated.

These optional functional ingredients are added to the first blend (i.e., aqueous liquid, an edible fat, and concentrated milk protein source) either before or after essentially all components in the first blend are hydrated. The particular timing of the addition of these optional function ingredients depends, at least in part, on the particular solid milk product being prepared. Generally, the emulsifier can be added either before or after essentially all components in the first blend are hydrated. The appropriate timing of the addition of the emulsifying salts and/or $TiO_2$, however, can vary depending on the total moisture level of the final solid milk product (see also FIG. 2). If the moisture level of the solid milk product is to be greater than about 25 percent, the emulsifying salts and/or the $TiO_2$ can be added to the first blend either before or after essentially all components in the first blend are hydrated. If, however, the moisture level of the solid milk product is to be less than about 25 percent, the emulsifying salts and/or the $TiO_2$ should be added to the first blend after essentially all components in the first blend are hydrated. Generally, however and largely for process consideration, all of these optional functional ingredients are added after essentially all components in the first blend are hydrated.

$TiO_2$ acts as a whitener and also decreases the stretchability (i.e., less taffy like) of the solid milk product. Emulsifying salts generally improve textural properties. For example, sodium citrate generally provides better mouth-melting properties and disodium phosphate generally provides a firmer solid milk product. Suitable emulsifying salts include, for example, sodium citrate, potassium citrate, monosodium phosphate, disodium phosphate, trisodium phosphate, sodium aluminum phosphate, sodium tripolyphosphate, sodium hexametaphosphate, dipotassium phosphate, sodium acid pryrophosphate, and the like, as well as mixtures thereof. Sodium citrate, disodium phosphate, or mixtures thereof are the preferred emulsifying salts. The emulsifiers generally provide a smoother product; they also assist in preparing aerated solid milk products. Suitable emulsifiers include, for example, monoglycerides, diglycerides, polysorbates, sodium stearoyl lactylate, lecithin, and the like as well as mixtures thereof. Monoglycerides, diglycerides, sodium stearoyl lactylate, and mixtures thereof are the preferred emulsifiers.

Generally, the amounts of these optional ingredients are as follows: 0 to about 3 percent emulsifying salts; 0 to about 1 percent $TiO_2$; and 0 to 1 percent emulsifiers. Preferably, the amount of added emulsifying salts is about 1 to about 2.5 percent, the amount of added $TiO_2$ is about 0.4 to about 0.9 percent, and the amount of added emulsifiers is about 0.05 to 0.7 percent. More preferably, the amount of added emulsifying salts is about 1.5 to about 2.5 percent, the amount of added $TiO_2$ is about 0.7 to about 0.9 percent, and the amount of added emulsifiers is about 0.15 to 0.4 percent. Although added emulsifiers can be used in unaerated solid milk products, their use in aerated solid milk products is especially preferred.

Once these optional ingredients are added, blending under high shear conditions is continued until a homogenous paste is obtained. As those skilled in the art will realize, increasing the temperature during blending will decrease the time required to obtain the desired homogenous paste. Preferably, the temperature is increased up to about 80 to about 90° C. After the homogenous paste is obtained, the mixture is pasteurized using conventional techniques and then cooled, preferably to below about 40° C. and more preferably below about 10° C., to form the solid milk product. If desired, the mixture can be homogenized before cooling. The solid milk product can be collected and packaged using conventional techniques. For example, the solid milk product can be filled into various containers or formed into solid bars, candy-type bars, cookies, cookies or bars with other ingredients (e.g., granola, grains, peanuts, other nuts, chocolate bits or chips, and the like), bite-sized forms or pieces, enrobed solid forms, shapes (e.g., animal, stars, letters), and the like—and can be produced with varying levels of sweetness. Shapes that appeal to children are especially preferred. The present product can also be produced in an aerated form.

If desired, other additives can be incorporated into the solid milk product of the present invention so long as these additives do not interfere or adversely effect the desired properties (i.e., firmness, water level, fat/protein ratio, and the like). Such additives include, for example, flavorants, fruits, nuts, colorants, stabilizers, emulsifiers, preservatives, additional nutrients, vitamins, mineral supplements (e.g., calcium fortification), and the like. If included, these additives generally constitute less than about 10 percent of the solid milk product. Such additives can be added either during the initial blending or after essentially all components have been hydrated. Preferably, solid additives are added during the high shear treatment and liquid additives are added during the initial blending. Of course, in cases where it is desired to maintain the physical integrity of the additives (e.g., fruit, nut, or grain pieces), the addition should be under low shear conditions only.

Figure 3:
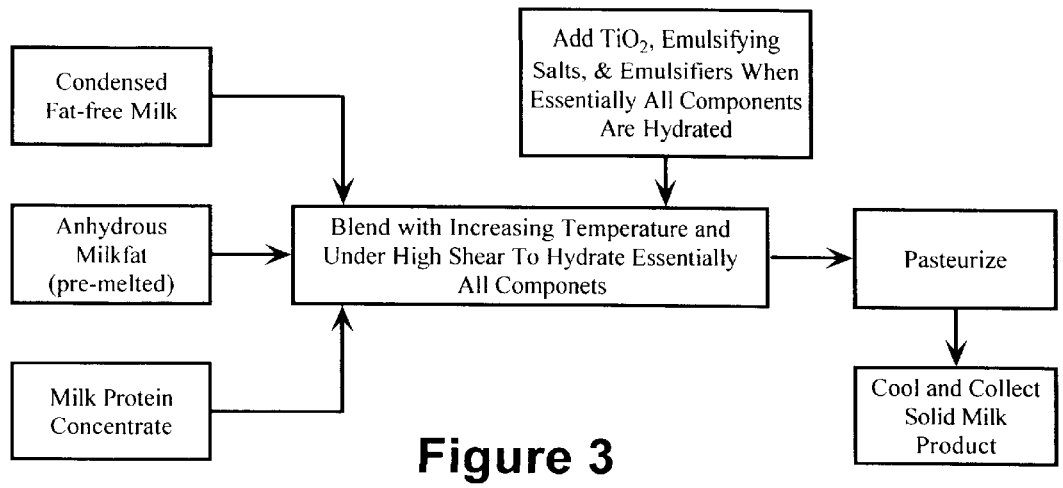
FIG. 3 is a flowchart illustrating a preferred embodiment of the process of the present invention wherein the $TiO_2$ and emulsifying salts are added after essentially all components are hydrated.
Figure 4:
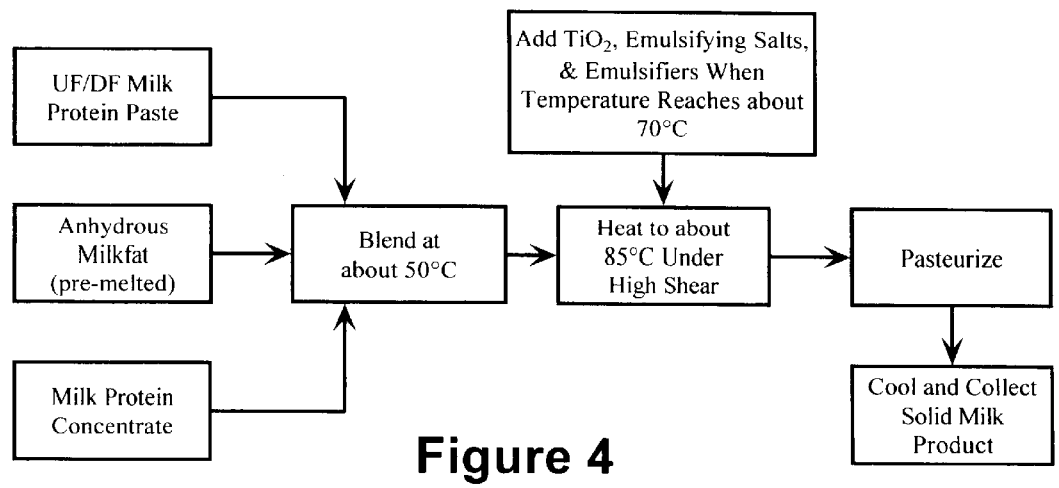
FIG. 4 is a flowchart illustrating another preferred embodiment of the process of the present invention wherein the $TiO_2$ and emulsifying salts are added after essentially all components are hydrated.

FIGS. 3 and 4 illustrate preferred methods for producing the solid milk products of this invention. Condensed milk or sweetened condensed milk, pre-melted anhydrous milkfat, and non-fat dry milk powder are blended at about 50° C. and then heated up to about 85° C. under high shear conditions. Once essentially all the lactose is hydrated (generally by the time the temperature reaches about 70° C. as shown in FIG. 4), the desired levels of sodium citrate, disodium phosphate, $TiO_2$, and/or emulsifiers are added. Mixing under high shear conditions is continued until a homogenous paste is obtained; normally such a homogeneous paste is obtained by the time the temperature reaches about 85° C. After pasteurization, homogenization (if desired), and cooling, the solid milk product can be collected and packaged.

Figure 5:
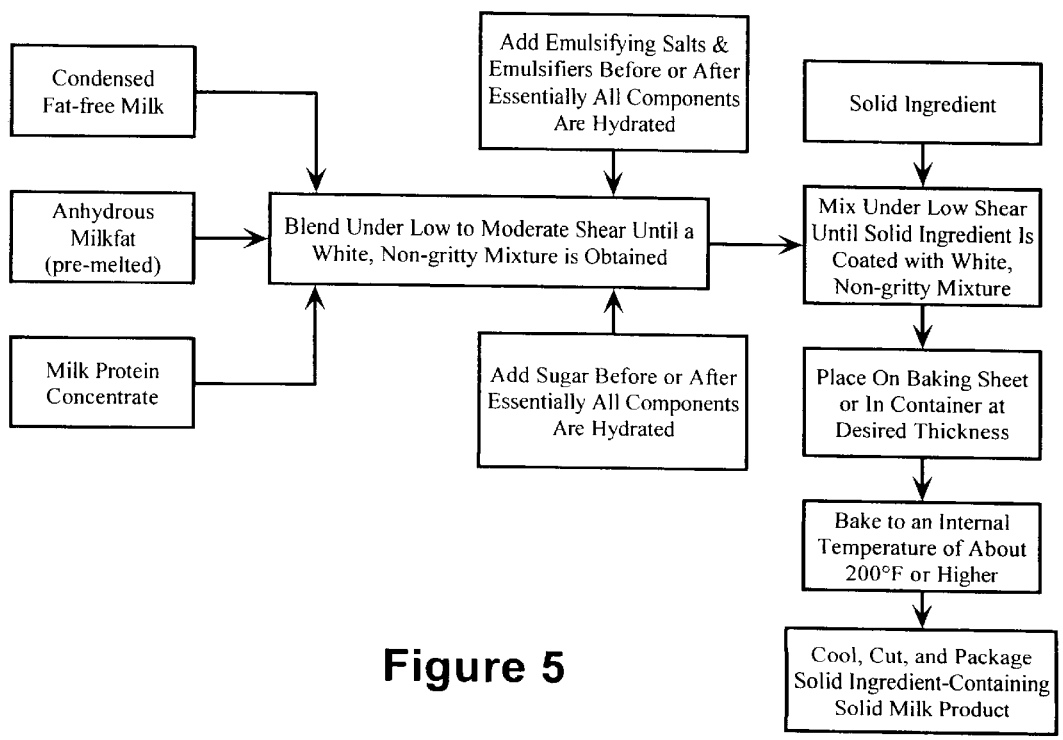
FIG. 5 is a flowchart illustrating the simplified process of this invention which is especially adapted for preparing solid ingredient-containing solid milk bars.

The simplified process of this invention is especially adapted for preparing solid ingredient-containing solid milk bars. This simplified production method eliminates some of the heating steps and the use of high shear mixing. The present invention provides a method for preparing a solid ingredient-containing solid milk product, said method comprising:

(1) blending an aqueous liquid and concentrated milk protein source under low to moderate shear conditions to form a first blend, wherein the blending continues until essentially all components in the first blend are hydrated and the first blend forms a sticky white mass;

(2) adding an emulsifying salt to the first blend either before or after essentially all components in the first blend are hydrated, (3) adding sugar to the first blend either before or after essentially all components in the first blend are hydrated;

(4) adding a solid ingredient to the sticky white mass to form a solid ingredient and first blend mixture;

(5) blending the solid ingredient and first blend mixture under low shear conditions until the solid ingredient is coated with the first blend to form a second blend;

(6) placing the second blend into a container;

(7) baking the second blend in the container; and (8) cooling the baked second blend to form the solid ingredient-containing solid milk product, wherein the relative amounts of the aqueous liquid, the emulsifying salt, and the concentrated milk protein source in the first blend are adjusted such that the solid ingredient-containing solid milk product has a moisture level of less than about 40 percent and a fat/protein ratio of less than about 2.5 and wherein the solid ingredient-containing solid milk product is a solid at ambient temperatures. FIG. 5 illustrates a preferred embodiment of the simplified process of this invention wherein an edible fat is also added to the first blend. The emulsifying salts and/or the sugars can be added before or after essentially all components are hydrated. Suitable solid ingredients for use in the present invention include cereals, grains, cookies, trail mix, dried fruits, nuts, and the like as well as mixtures thereof. The present invention also provides a simplified method for preparing a solid ingredient-containing solid milk product, said method comprising:

(1) blending an aqueous liquid, an edible fat, and concentrated milk protein source under low to moderate shear conditions to form a first blend, wherein the blending continues until essentially all components in the first blend are hydrated and the first blend forms a sticky white mass and wherein the edible fat has a melting point less than about 50° C.;

(2) adding an emulsifying salt to the first blend either before or after essentially all components in the first blend are hydrated, (3) adding sugar to the first blend either before or after essentially all components in the first blend are hydrated;

(4) adding a solid ingredient to the sticky white mass to form a solid ingredient and first blend mixture;

(5) blending the solid ingredient and first blend mixture under low shear conditions until the solid ingredient is coated with the first blend to form a second blend;

(6) placing the second blend into a container;

(7) baking the second blend in the container; and (8) cooling the baked second blend to form the solid ingredient-containing solid milk product, wherein the relative amounts of the aqueous liquid, the edible fat, the emulsifying salt, and the concentrated milk protein source in the first blend are adjusted such that the solid ingredient-containing solid milk product has a moisture level of less than about 40 percent and a fat/protein ratio of less than about 2.5 and wherein the solid ingredient-containing solid milk product is a solid at ambient temperatures.

Generally, the same individual components used in the general methods illustrated in FIGS. 2–4 are used in the simplified method illustrated in FIG. 5. Using the simplified method, condensed milk, anhydrous milkfat (preferably premelted), and milk protein concentrate are blended under low to moderate shear (i.e., a bulk peak shear of less than about 950 sec$^{-1}$ and preferably less than about 800 sec$^{-1}$) until a white, non-gritty mixture (i.e., the first blend) is obtained. Although low to moderate shear mixing of the components is generally preferred, high shear mixing can be used to prepare the white, non-gritty mixture if desired. Generally, such a white, non-gritty mixture is obtained after about 1 to about 10 minutes of low to moderate shear mixing. Generally, the color before shear mixing is yellow-gray to off-white. Generally, the viscosity of the white, non-gritty mixture is less than about 43,000 Pa-sec at a shear rate of about 0.1 sec$^{-1}$ and preferably is about 200 to about 2000 Pa-sec at a shear rate of about 0.1 sec$^{-1}$. As opposed to the general methods illustrated in FIGS. 2–4, it is generally preferred that $TiO_2$ is not used in the simplified method of FIG. 5 since a bright white color is developed without used such a whitener. If desired, however, $TiO_2$ can be incorporated into the product to provide increased whiteness. Emulsifying salts and emulsifiers can be added either before or after essentially all the components in the first blend are hydrated; generally, complete hydration will have occurred by the time the white, non-gritty mixture has been formed. Once the white, non-gritty mixture is formed, the desired solid components can be added and blended into the first blend under low shear conditions (generally a bulk peak shear of less than about 800 sec$^{-1}$ and preferably less than about 600 sec$^{-1}$) until the solid components are uniformly coated with the first blend and uniformly distributed through the first blend; usually this blending step requires about a minute or less. This step should generally be carried out using gentle blending so as to avoid undesirable breakup or diminution of the solid components. Once the solid components are uniformly coated with the first blend, the mixture is then pressed onto a baking sheet or placed into an appropriate baking container at the desired thickness. The mixture is then baked to an internal temperature of about 185° F. or higher; generally the baking time is about 15 to about 40 minutes, depending on the desired degree of browning and crispiness/chewiness desired, for a product having a thickness of about 0.5 to about 1 inch. Baking can be carried out in any suitable oven, including, for example, conventional ovens, microwave ovens, impingement ovens, forced air ovens, steam injection devices, indirect heating devices, and the like. If desired, the solid component-containing first blend can be molded into the desired shape prior to baking or pressed down to obtain the desired density. Generally a density of about 1 to about 1.2 g/ml before baking provides good results. After baking, the product is cooled, cut, and packaged as appropriate to obtain the final solid component-containing solid milk product.

As noted above, it is generally preferred in this simplified method that emulsifying salts and emulsifiers are added once essentially all the components in the first blend are hydrated. If desired, however, all components can be added at once and the mixture blended until essentially all components are hydrated. Sweeteners, including natural and artificial sugars, can be added to obtain the desired sweetness. Such sweeteners are preferably added after hydration of the other components to avoid hydration competition from the sweeteners. If desired, however, a portion of the sweeteners can be added prior to hydration with the remainder added after hydration; sweeteners added before hydration can be used to modify the viscosity of the mixture during the initial blending step. Moreover, and if desired, all components, including the sweeteners, can be added before the initial blending step. Generally, the amount of sweeteners added will be in the range of about 20 to about 50 percent.

Generally, the solid component-containing solid milk product contains about 30 to about 80 percent of the solid component. Suitable solid ingredients for use in the present invention include cereals, grains, cookies, trail mix, dried fruits, nuts, and the like as well as mixtures thereof. The size of the individual solid components can vary widely but will generally be in the range of about 0.1 to about 0.5 inches in diameter. The mixing used to blend the solid component into the solid milk mixture should be sufficiently gentle so as to avoid destroying the integrity of the solid component or to reducing the particle size to an undesired level. Especially fragile solid components (e.g., puffed rice or similar components) should be added to the solid milk mixture just prior to the baking step and incorporated into the solid milk mixture using very gentle mixing to maintain integrity of the solid component.

Prior to the baking step, all blending steps are carried out at or close to ambient temperatures (i.e., about 55 to about 85° F.). Once placed in the appropriate container, the mixture of solid component coated with the first blend can be baked or cooked using conventional techniques so long as the desired internal temperature (i.e., about 185° F. or higher) is obtained. Generally, baking at about 300 to about 350° F. will allow the appropriate internal temperature to be obtained in a reasonable time period; of course, the time required to obtain the desired temperature will depend, in part, on the total thickness of the mixture. A conventional radiant or convection oven allows for a browned appearance whereas a microwave oven will give a lighter appearance; if desired both a conventional radiant or convection oven and a microwave oven can be used in combination in order to achieve the desired degree of browning. Generally, the baking step provides a pathogen kill step and reduces the water activity to below about 0.75; preferably the water activity is reduced to below about 0.65 and even more preferably to about 0.5 to about 0.55. Generally, the solid component-containing solid milk products have shelf-lives of at least about 3 months under ambient, non-refrigeration conditions and at least about 7 months under refrigeration conditions.

The solid milk products of the present invention prepared using any of the methods of this invention can be aerated if desired using conventional aeration techniques. For example, after pasteurization the product can be aerated using a gas such as, for example, air, nitrogen, or carbon dioxide. Generally, the aerated milk product of this invention has a density of less than about 1.14 g/ml as compared to about 1.2 to about 1.3 g/ml for the unaerated product. Aeration can be used to prepare solid milk products which resemble ice cream, yogurt, and the like. Moreover, it has also been found that the solid component-containing solid milk products containing relatively high proportions of the solid milk component relative to the solid component (i.e., about 70 to about 80 percent solid milk component), when baked, generate a "puffed" appearance and have air cells that are generally small and well distributed without any added gas or other aeration techniques.

The following examples are included to illustrate the invention and not to limit it. Unless otherwise indicated, all percentages are by weight.

EXAMPLE 1

A jacketed cooker equipped with a rotating agitator was heated to about 130° C. About 1.4 lbs fat-free sweetened condensed milk, about 0.3 lbs anhydrous milkfat (premelted), and about 0.3 lbs non-fat dry milk powder were added to the cooker to form the base mixture. The temperature of the base mixture was allowed to rise from about 50 to about 85° C. over a period of about 5 minutes under high shear conditions. The high shear conditions were provided using the rotating agitator at about 3000 rpm; the bulk peak shear was about 1100 sec$^{-1}$. Once the temperature reached about 85° C. (i.e., after essentially all components are fully hydrated), about 0.02 lbs $TiO_2$ was added to the base mixture while maintaining high shear. Heating and high shear was continued until the temperature returned to about 85° C. The product was pasteurized by holding the temperature at about 85° C. for about 17 seconds. The consistency of the mixture was similar to a hot pudding. The resulting mixture was then cooled to below about 45° C. to form the solid milk product having about 79 percent solids. The overall time from the initial heating step to cooling the final product was about 10 minutes.

Typical analytical data for various solid milk products, along with comparable data for liquid milk, are provided below:

|  | Typical Liquid Milk | Solid Milk (75% Solids) | Solid Milk (80% Solids) |
| --- | --- | --- | --- |
| Fat | ~3.8% | 14.8% | 14.1% |
| Protein | ~3.2% | 12.2% | 12.0% |
| Lactose | ~4.6% | 18.3% | 18.1% |
| Added Sweetener | 0 | 24.7% | 32.6% |
| Moisture | ~87% | 25.0% | 20.3% |

The resulting product was firm (i.e., self-supporting) and could be molded into a variety of shapes. Water activity was about 0.7 to about 0.81. The product was smooth, melted in the mouth, and had a pleasant milky flavor.

EXAMPLE 2

A similar experiment as described in Example 1 was carried out except that the bulk peak shear rate was only about 880 sec$^{-1}$ (corresponding to an agitator speed of about 2400 rpm). The resulting product was gritty and grainy and was not considered acceptable.

EXAMPLE 3

A similar experiment as described in Example 1 was carried out except that the moisture level was adjusted to be less than about 25 percent and the $TiO_2$ was added to the base mixture before the components were fully hydrated. The resulting product was gritty and was not considered acceptable.

EXAMPLE 4

Using essentially the same procedures as described in Example 1, about 1.7 lbs condensed skim milk (about 32 percent solids), about 0.66 lbs anhydrous milkfat, about 0.5 lbs milk protein concentrate (Alapro 4700; New Zealand Milk Products), and about 1 lb sucrose were mixed and heated to about 80° C. over a period of about 10 minutes under high shear conditions. The high shear conditions were provided using a rotating agitator at about 3000 rpm; the bulk peak shear was about 1100 sec$^{-1}$. Once the temperature reached about 80° C. (i.e., after essentially all components are fully hydrated), about 0.04 lbs $TiO_2$ and about 0.09 lbs sodium citrate were added. Heating under high shear was continued to about 85° C. The product was pasteurized by holding the temperature at about 85° C. for about 30 seconds. The consistency of the mixture was similar to a hot process cheese. The resulting mixture was then cooled to below about 5° C. to form the solid milk product having about 73 percent solids (i.e., moisture content of about 27 percent). The overall time from the initial heating step to cooling the final product was about 15 minutes. The resulting white solid milk product was firm (i.e., self-supporting), had a smooth, non-grainy texture, and dissolved rapidly in the mouth.

EXAMPLE 5

Using essentially the same procedures as described in Example 1, about 37.4 lbs sweetened condensed skim milk (about 72 percent solids), about 5.6 lbs anhydrous milkfat, about 5.0 lbs non-fat dry milk, and about 0.08 lb monoglycerides and diglycerides (Dimodan) were mixed and heated to about 74° C. over a period of about 5 minutes under high shear conditions. The high shear conditions were provided using a rotating agitator at about 3000 rpm; the bulk peak shear was about 1500 sec$^{-1}$. Once the temperature reached about 80° C. (i.e., after essentially all components are fully hydrated), about 0.4 lbs TiO$_2$ and about 1 lb sodium citrate were added. Heating under high shear was continued at about 80° C. for about 10 minutes. The consistency of the mixture was similar to a hot process cheese. The resulting mixture was then aerated using a roto-stator type aeration device with nitrogen gas. The aerated mixture was then cooled to below about 5° C. to form the solid milk product having about 78 percent solids (i.e., moisture content of about 22 percent) and an overrun of about 16 to about 20 percent. The overall time from the initial heating step to cooling the final product was about 30 minutes. The aerated white solid milk product resembled ice cream in appearance, texture, and taste.

EXAMPLE 6

Using essentially the same procedures as described in Example 1, about 53 percent ultrafiltered whole milk (low lactose with a moisture of about 55 percent), about 40 percent corn syrup solids (24DE), about 1 percent sodium citrate, about 0.8 percent TiO$_2$, about 0.7 percent salt, about 4.5 percent glycerol, and about 0.5 percent sodium stearoyl lactylate were blended to together and then subjected to a bulk peak shear of about 1350 sec$^{-1}$ for about 15 seconds. The resulting mixture was heated to about 82° C. over about a 5 minute period. An unaerated solid milk product was obtained having about 70 percent solids, about 10.1 percent fat, about 7.95 percent protein, about 1.9 percent lactose, and about 39.5 percent added sugars. The product was firm, white, high in dairy flavor, and not too sweet.

EXAMPLE 7

This example illustrates the preparation of granola-containing solid milk products prepared using the simplified process of this invention. A solid milk blend was prepared using the following formulation:

| Component | Amount (%) |
| --- | --- |
| salt | 0.2 |
| sugar | 34.5 |
| sodium citrate | 0.5 |
| whey protein concentrate | 6.0 |
| corn syrup solids (10DE) | 8.3 |
| 5X ultrafiltered whole milk | 50.0 |
| sodium stearoyl lactylate | 0.5 |

The solid milk components were blended without heat in a Kitchenaid mixer under moderate shear (i.e., setting of 2 out a maximum of 10) for about 5 to minutes to produce a smooth (i.e., not gritty), sticky, and bright white mixture. Granola was added and mixed, again without heating, under low speed for about 15 to 20 seconds to fully coat the solid component without adversely affecting the integrity of the solid component. Generally, the final mixture contained about 40 percent solid milk mixture and about 60 percent granola.

The final mixture was pressed onto a baking sheet at a thickness of about ¾ inches and then baked under various conditions as illustrated in the following table:

| Oven | Baking Conditions | Results |
| --- | --- | --- |
| Conventional | 325° F./40 minutes | Good product, extremely browned |
| Conventional | 325° F./33 minutes | Good product; very browned |
| Conventional | 325° F./30 minutes, out 2 minutes, bake 2 minutes | Good product; slightly brown |
| Microwave | high/3 minutes | Good product; very white |
| Microwave | high/3.5 minutes | Good product; very white |

In all cases, the internal temperature achieved during baking was about 190 to about 209° F.

EXAMPLE 8

This example illustrates the preparation of granola and fruit- and/or nut-containing solid milk products prepared using the simplified process of this invention. A solid milk blend was prepared using the following formulation:

| Component | Amount (%) |
| --- | --- |
| salt | 0.18 |
| sugar | 30.6 |
| sodium citrate | 0.45 |
| nonfat dry milk | 11.3 |
| whey protein concentrate | 5.3 |
| corn syrup solids (10DE) | 7.3 |
| 5X ultrafiltered reduced fat milk | 44.3 |
| sodium stearoyl lactylate | 0.45 |

Combined the nonfat dry milk and ultrafiltered milk; the other solid milk components were then added and the mixture blended without heat in a Kitchenaid mixer under moderate shear (i.e., setting of 2 out a maximum of 10) for about 5 to 10 minutes to produce a smooth (i.e., not gritty), sticky, and bright white mixture. Granola was added and mixed, again without heating, under low speed for about 15 to 20 seconds to fully coat the solid component without adversely affecting the integrity of the solid component. Generally, the this mixture contained about 50 percent solid milk mixture and about 50 percent granola and had a moisture content of about 16.5 percent.

The granola/solid milk mixture was then combined with the desired fruit and/or nut components using low shear mixing for about 10 to about 20 seconds. The resulting mixture was formed into clusters (about 1 inch in diameter) on parchment paper and placed on a baking sheet. The following combinations were prepared and baked as indicated in a conventional oven:

| Granola/Solid Milk (%) | Trail Mix; Amount (%) | Baking Conditions | Results |
| --- | --- | --- | --- |
| 82 | Planters Apple-Cranberry Crunch; 18 | 325° F./ 15 min | Good taste; dark and crunchy |
| 82 | Planters Caribbean Crunch; 18 | 325° F./ 16 min | Good taste; moderate browning |
| 82 | Planters Nuts, Seeds & Rasin; 18 | 325° F./ 17 min | Good taste; moderate browning |
| 82 | Planters Fruit & Nut; 18 | 325° F./ 17 min | Good taste; moderate browning |

EXAMPLE 9

This example illustrates the preparation of cookie-containing solid milk products prepared using the simplified process of this invention. A solid milk blend was prepared using the following formulation:

| Component | Amount (%) |
| --- | --- |
| salt | 0.2 |
| sugar | 27.5 |
| sodium citrate | 0.5 |
| nonfat dry milk | 13.0 |
| corn syrup solids (10DE) | 8.3 |
| 5X ultrafiltered whole milk | 50.0 |
| sodium stearoyl lactylate | 0.5 |

The solid milk components were mixed essentially as described in Example 8. Cookies were then added to the mixture; the cookies with coated with the solid milk mixture by gentle stirring using a spoon to avoid cookie breakage. Cookies used included Mini-Oreos™, Chips Ahoy!™ with pecans, and Teddy Grahams™. Generally, this mixture contained about 45 percent solid milk mixture and about 55 percent cookies and had a moisture content of about 14 percent. The resulting mixture was spread on a baking sheet (about ¾ inches thick) and baked at about 300° F. for about 25 minutes using a conventional oven. After baking and cooling for about 30 minutes, about half of the product was cut into bars and packaged immediately whereas the other half was allowed to stand under ambient conditions before cutting and packaging.

All products had good and strong milky taste. Generally, the product packaged immediately after cooling were better. In some cases, the product tended to break upon handling; this appears to be due to size of the cookies (i.e., not broken) and resulting voids within the product matrix; this problem should be eliminated and/or significantly reduced by reducing the size of the cookies and/or using cookie pieces and/or increasing the proportion of the milk component. Generally, bars located near the edges of the baking sheet tended to be crunchier and with increased browning as compared to those formed from the middle of the baking sheet. Increased crunchiness and browning for the "edge" product appears to be due to decreased thickness close to the edges; thus, a thinner layer should allow for a crunchier product.

EXAMPLE 10

This example illustrates an alternative method of manufacture where the mixture is first mixed together under moderate shear and then heated. A solid milk blend was prepared using the following formulation:

| Component | Amount (%) |
| --- | --- |
| Non Fat Dry Milk | 9.6 |
| Milk Protein Concentrate | 8.8 |
| Cream | 32.4 |
| High Fructose Corn Syrup | 43.8 |
| Water | 4.0 |
| Sodium Citrate | 0.5 |
| Titanium Dioxide | 0.3 |
| Vanilla Flavor | 0.7 |

The solid milk components were mixed essentially as described in Example 8 (i.e., moderate shear without the addition of heat). The grainy mixture had a solids level of about 69 percent, fat level of about 14.4 percent, and a total milk protein level of about 10.0 percent. After mixing, the product was placed into an indirect heating vessel and heated to 185° F. under low shear conditions. The product became very smooth and creamy as it was heated, and no graininess remained. The finished product had a very smooth texture and pleasing milk and vanilla flavor.

What is claimed is:

1. A method for preparing a solid milk product, said method comprising:

blending an aqueous liquid, an edible fat, and concentrated milk protein source at a temperature of about 40 to about 95° C. and under high shear conditions with a bulk peak shear rate of greater than about 950 sec$^{-1}$ to form a first blend, wherein the blending continues until essentially all components in the first blend are hydrated and wherein the edible fat has a melting point less than about 50° C.;

(2) adding 0 to 1 percent of an emulsifier to the first blend either before or after essentially all components in the first blend are hydrated;

(3) adding, once essentially all components in the first blend are hydrated, 0 to about 3 percent of an emulsifying salt and 0 to about 1 percent TiO$_2$ to form a second blend;

(4) continuing to heat the second blend to the temperature of about 65 to about 95° C. under the high shear conditions until a homogeneous paste is obtained;

(5) pasteurizing the homogenous paste; and (6) cooling the pasteurized homogenous paste to form the solid milk product, wherein the relative amount of the aqueous liquid, the edible fat, and the concentrated milk protein source in the first blend are adjusted such that the solid milk product has a moisture level of less than about 40 percent and a fat/protein ratio of less than about 2.5 and wherein the solid milk product is a solid at ambient temperatures.

2. The method of claim 1, wherein the relative amount of the aqueous liquid, the edible fat, and the concentrated milk protein source in the first blend are adjusted such that the solid milk product has a moisture level of about 10 to about 30 percent and a fat/protein ratio of less than about 2.

3. The method of claim 1, wherein the relative amount of the aqueous liquid, the edible fat, and the concentrated milk protein source in the first blend are adjusted such that the solid milk product has a moisture level of about 10 to about 30 percent and a fat/protein ratio of about 0.5 to about 1.5.

4. The method of claim 1, wherein the aqueous liquid is selected from the group consisting of water, flavored water, fruit juice, liquid fruit concentrate, condensed milk, sweetened condensed milk, condensed fat-free milk, sweetened condensed fat-free milk, ultrafiltered milk, ultrafiltered skim milk, ultrafiltered/diafiltered milk, ultrafiltered/diafiltered skim milk, and mixtures thereof; wherein the edible fat is selected from the group consisting of butter, cream, anhydrous milkfat, vegetable fats, coco butter, and mixtures thereof; and wherein the concentrated milk protein source is selected from the group consisting of non-fat dry milk powder, milk protein concentrate, ultrafiltered milk protein concentrate, ultrafiltered/diafiltered milk protein concentrate, ultrafiltered milk protein paste, ultrafiltered/diafiltered milk protein paste, whey protein concentrate, caseinates, and mixtures thereof.

5. The method of claim 2, wherein the aqueous liquid is selected from the group consisting of water, flavored water, fruit juice, liquid fruit concentrate, condensed milk, sweetened condensed milk, condensed fat-free milk, sweetened condensed fat-free milk, ultrafiltered milk, ultrafiltered skim milk, ultrafiltered/diafiltered milk, ultrafiltered/diafiltered skim milk, and mixtures thereof; wherein the edible fat is selected from the group consisting of butter, cream, anhydrous milkfat, vegetable fats, coco butter, and mixtures thereof; and wherein the concentrated milk protein source is selected from the group consisting of non-fat dry milk powder, milk protein concentrate, ultrafiltered milk protein concentrate, ultrafiltered/diafiltered milk protein concentrate, ultrafiltered milk protein paste, ultrafiltered/diafiltered milk protein paste, whey protein concentrate, caseinates, and mixtures thereof.

6. The method of claim 1, wherein the solid milk product also contains an added sweetener at a level of up to about 35 percent.

7. The method of claim 2, wherein the solid milk product also contains an added sweetener at a level of up to about 35 percent.

8. The method of claim 4, wherein the solid milk product also contains added sucrose at a level of up to about 35 percent.

9. The method of claim 5, wherein the solid milk product also contains added sucrose at a level of up to about 35 percent.

10. A method for preparing a solid milk product, said method comprising:
(1) blending about 20 to about 50 percent condensed fat-free milk or sweetened condensed fat-free milk, about 10 to about 35 percent anhydrous milkfat, and about 8 to about 30 percent concentrated dry milk powder at a temperature of about 40 to about 95° C. to form a first blend, wherein the blending continues until essentially all components in the first blend are hydrated;
(2) heating the first blend to a temperature of about 60 to about 95° C. under high shear conditions with a bulk peak shear rate of greater than about 950 sec$^{-1}$;
(3) adding 0 to 1 percent of an emulsifier to the first blend either before or after essentially all components in the first blend are hydrated;
(4) adding, once essentially all components in the first blend are hydrated, about 1 to about 3 percent of an emulsifying salt and about 0.4 to about 1 percent TiO$_2$ to the first blend to form a second blend;
(5) continuing to heat the second blend to the temperature of about 65 to about 95° C. under the high shear conditions until a homogeneous paste is obtained;
(6) pasteurizing the homogenous paste; and
(7) cooling the pasteurized homogenous paste to form the solid milk product, wherein the solid milk product is a solid at ambient temperatures, has a moisture level of less than about 40 percent, and has a fat/protein ratio of less than about 2.5.

11. The method of claim 10, wherein the solid milk product has a moisture level of about 10 to about 30 percent and a fat/protein ratio of less than about 2.

12. The method of claim 10, wherein the solid milk product has a moisture level of about 10 to about 30 percent and a fat/protein ratio of about 0.5 to about 1.5.

13. The method of claim 10, wherein the first blend comprises about to about 50 percent condensed fat-free milk or sweetened condensed fat-free milk, about 10 to about 35 percent anhydrous milkfat, and about 8 to about 30 percent non-fat dry milk powder.

14. The method of claim 11, wherein the first blend comprises about 20 to about 50 percent condensed fat-free milk or sweetened condensed fat-free milk, about 10 to about 35 percent anhydrous milkfat, and about 8 to about 30 percent non-fat dry milk powder.

15. The method of claim 13, wherein the first blend comprises about 25 to about 40 percent condensed fat-free milk or sweetened condensed fat-free milk, about 14 to about 20 percent anhydrous milkfat, and about 12 to about 25 percent non-fat dry milk powder.

16. The method of claim 14, wherein the first blend comprises about 25 to about 40 percent condensed fat-free milk or sweetened condensed fat-free milk, about 14 to about 20 percent anhydrous milkfat, and about 12 to about 25 percent non-fat dry milk powder.

17. The method of claim 15, wherein the amount of added emulsifying salt is about 1 to about 2.5 percent and the amount of added TiO$_2$ is about 0.4 to about 0.9 percent.

18. The method of claim 17, wherein the solid milk product is aerated and the amount of added emulsifier is about 0.05 to 0.7 percent.

19. The method of claim 16, wherein the amount of added emulsifying salt is about 1 to about 2.5 percent and the amount of added TiO$_2$ is about 0.4 to about 0.9 percent.

20. The method of claim 19, wherein the solid milk product is aerated and the amount of added emulsifier is about 0.05 to 0.7 percent.

21. A method for preparing a solid milk product having a moisture level of less than about 40 percent, said method comprising:
(1) blending an aqueous liquid, an edible fat, and concentrated milk protein source at a temperature of about 40 to about 95° C. and under high shear conditions with a bulk peak shear rate of greater than about 950 sec$^{-1}$ to form a first blend, wherein the blending continues until essentially all components in the first blend are hydrated and wherein the edible fat has a melting point less than about 50° C.;
(2) adding 0 to about 1 percent of an emulsifier to the first blend either before or after essentially all components in the first blend are hydrated;
(3) added 0 to about 3 percent of an emulsifying salt and 0 to about 1 percent TiO$_2$ to the first blend to form a second blend; wherein, if the moisture level of the solid milk product is to be greater than about 25 percent, the emulsifying salt and the TiO$_2$ are added to the first blend either before or after essentially all components in the first blend are hydrated; and wherein, if the moisture level of the solid milk product is to be less than about 25 percent, the emulsifying salt and the TiO$_2$ are added to the first blend after essentially all components in the first blend are hydrated;

(4) continuing to heat the second blend to the temperature of about 65 to about 95° C. under the high shear conditions until a homogeneous paste is obtained;

(5) pasteurizing the homogenous paste; and (6) cooling the pasteurized homogenous paste to form the solid milk product, wherein the relative amount of the aqueous liquid, the edible fat, and the concentrated milk protein source in the first blend are adjusted such that the solid milk product has a moisture level of less than about 40 percent and a fat/protein ratio of less than about 2.5; and wherein the solid milk product is a solid at ambient temperatures.

22. The method of claim 21, wherein the solid milk product has a moisture level of about 10 to about 30 percent and a fat/protein ratio of less than about 2.

23. The method of claim 21, wherein the solid milk product has a moisture level of about 10 to about 30 percent and a fat/protein ratio of about 0.5 to about 1.5.

24. The method of claim 21, wherein the first blend comprises about 20 to about 50 percent condensed fat-free milk or sweetened condensed fat-free milk, about 10 to about 35 percent anhydrous milkfat, and about 8 to about 30 percent non-fat dry milk powder.

25. The method of claim 22, wherein the first blend comprises about 20 to about 50 percent condensed fat-free milk or sweetened condensed fat-free milk, about 10 to about 35 percent anhydrous milkfat, and about 8 to about 30 percent non-fat dry milk powder.

26. The method of claim 21, wherein the amount of added emulsifying salt is about 1 to about 2.5 percent and the amount of added $TiO_2$ is about 0.4 to about 0.9 percent.

27. The method of claim 26, wherein the solid milk product is aerated and the amount of added emulsifier is about 0.05 to 0.7 percent.

28. The method of claim 22, wherein the amount of added emulsifying salt is about 1 to about 2.5 percent and the amount of added $TiO_2$ is about 0.4 to about 0.9 percent.

29. The method of claim 28, wherein the solid milk product is aerated and the amount of added emulsifier is about 0.05 to 0.7 percent.

30. A solid milk product comprising about 15 to about 60 percent of an aqueous liquid, about 8 to about 40 percent of an edible fat; about 10 to about 35 percent of a concentrated milk protein source; 0 to about 3 percent of an emulsifying salt; 0 to about 1 percent $TiO_2$; and 0 to 1 percent of an emulsifier, wherein the solid milk product is a solid at ambient temperatures, has a moisture level of less than about 40 percent, and has a fat/protein ratio of less than about 2.5.

31. The solid milk product of claim 30, where the aqueous liquid is condensed fat-free milk or sweetened condensed fat-free milk; wherein the edible fat is anhydrous milkfat; and wherein the concentrated milk protein source is non-fat dry milk powder.

32. The solid milk product of claim 31, wherein the solid milk product has a moisture level of about 10 to about 30 percent and a fat/protein ratio of less than about 2.

33. The solid milk product of claim 31, wherein the solid milk product has a moisture level of about 10 to about 30 percent and a fat/protein ratio of about 0.5 to about 1.5.

34. The solid milk product of claim 32, wherein the solid milk product contains about 20 to about 50 percent condensed fat-free milk or sweetened condensed fat-free milk; about 10 to about 35 percent anhydrous milkfat; about 8 to about 30 percent non-fat dry milk powder; about 1 to about 2.5 percent of the emulsifying salt; and about 0.4 to about 0.9 percent $TiO_2$.

35. The solid milk product of claim 34, wherein the solid milk product is aerated and further comprising about 0.05 to 0.7 percent emulsifier.

36. The solid milk product of claim 33, wherein the solid milk product contains about 20 to about 50 percent condensed fat-free milk or sweetened condensed fat-free milk; about 10 to about 35 percent anhydrous milkfat; about 8 to about 30 percent non-fat dry milk powder; about 1 to about 2.5 percent of the emulsifying salt; and about 0.4 to about 0.9 percent $TiO_2$.

37. The solid milk product of claim 36, wherein the solid milk product is aerated and further comprising about 0.05 to 0.7 percent emulsifier.

38. The solid milk product of claim 30 further comprising up to about 35 percent added sweetener.

39. The solid milk product of claim 34 further comprising up to about 35 percent added sweetener.

40. The solid milk product of claim 36 further comprising up to about 35 percent added sweetener.

41. A method for preparing a solid ingredient-containing solid milk product, said method comprising:

(1) blending an aqueous liquid and concentrated milk protein source under low to moderate shear conditions to form a first blend, wherein the blending continues until essentially all components in the first blend are hydrated and the first blend forms a sticky white mass;

(2) adding an emulsifying salt to the first blend either before or after essentially all components in the first blend are hydrated, (3) adding sugar to the first blend either before or after essentially all components in the first blend are hydrated;

(4) adding a solid ingredient to the sticky white mass to form a solid ingredient and first blend mixture;

(5) blending the solid ingredient and first blend mixture under low shear conditions until the solid ingredient is coated with the first blend to form a second blend;

(6) placing the second blend into a container;

(7) baking the second blend in the container; and (8) cooling the baked second blend to form the solid ingredient-containing solid milk product, wherein the relative amounts of the aqueous liquid, the emulsifying salt, and the concentrated milk protein source in the first blend are adjusted such that the solid ingredient-containing solid milk product has a moisture level of less than about 40 percent and a fat/protein ratio of less than about 2.5 and wherein the solid ingredient-containing solid milk product is a solid at ambient temperatures.

42. The method as defined in claim 41, wherein the first blend further comprises an edible fat having a melting point less than about 50° C. and wherein the relative amounts of the aqueous liquid, the edible fat, the emulsifying salt, and the concentrated milk protein source in the first blend are adjusted such that the solid ingredient-containing solid milk product has a moisture level of less than about 40 percent and a fat/protein ratio of less than about 2.5.

43. The method as defined in claim 42, wherein the solid ingredient is selected from the group consisting of cereals, grains, cookies, trail mix, dried fruits, nuts, and mixtures thereof.

44. The method as defined in claim 42, wherein the solid ingredient-containing solid milk product contains about 30 to about 80 percent of the solid ingredient.

45. The method as defined in claim 43, wherein the solid ingredient-containing solid milk product contains about 45 to about 70 percent of the solid ingredient.

46. The method as defined in 44, wherein the solid ingredient-containing solid milk product has a moisture level of about 10 to about 30 percent and a fat/protein ratio of about 0.5 to about 1.5.

47. The method as defined in 45, wherein the solid ingredient-containing solid milk product has a moisture level of about 10 to about 30 percent and a fat/protein ratio of about 0.5 to about 1.5.

48. The method as defined in claim 43, wherein the aqueous liquid is selected from the group consisting of water, flavored water, fruit juice, liquid fruit concentrate, condensed milk, sweetened condensed milk, condensed fat-free milk, sweetened condensed fat-free milk, ultrafiltered milk, ultrafiltered skim milk, ultrafiltered/diafiltered milk, ultrafiltered/diafiltered skim milk, and mixtures thereof; wherein the edible fat is selected from the group consisting of butter, cream, anhydrous milkfat, vegetable fats, coco butter, and mixtures thereof; and wherein the concentrated milk protein source is selected from the group consisting of non-fat dry milk powder, milk protein concentrate, ultrafiltered milk protein concentrate, ultrafiltered/diafiltered milk protein concentrate, ultrafiltered milk protein paste, ultrafiltered/diafiltered milk protein paste, whey protein concentrate, caseinates, and mixtures thereof.

49. The method as defined in claim 47, wherein the aqueous liquid is selected from the group consisting of water, flavored water, fruit juice, liquid fruit concentrate, condensed milk, sweetened condensed milk, condensed fat-free milk, sweetened condensed fat-free milk, ultrafiltered milk, ultrafiltered skim milk, ultrafiltered/diafiltered milk, ultrafiltered/diafiltered skim milk, and mixtures thereof; wherein the edible fat is selected from the group consisting of butter, cream, anhydrous milkfat, vegetable fats, coco butter, and mixtures thereof; and wherein the concentrated milk protein source is selected from the group consisting of non-fat dry milk powder, milk protein concentrate, ultrafiltered milk protein concentrate, ultrafiltered/diafiltered milk protein concentrate, ultrafiltered milk protein paste, ultrafiltered/diafiltered milk protein paste, whey protein concentrate, caseinates, and mixtures thereof.

50. A method for preparing a solid milk product, said method comprising:
blending an aqueous liquid, an edible fat, and concentrated milk protein source under moderate shear conditions with a bulk peak shear rate of greater than about 500 sec$^{-1}$ to form a first blend, wherein the blending continues until essentially all components in the first blend are hydrated and wherein the edible fat has a melting point less than about 50° C.;

(2) adding 0 to 1 percent of an emulsifier to the first blend either before or after essentially all components in the first blend are hydrated;

(3) adding, once essentially all components in the first blend are hydrated, 0 to about 3 percent of an emulsifying salt and 0 to about 1 percent TiO$_2$ to form a second blend;

(4) heating the second blend to the temperature of about 65 to about 95° C. under low to high shear conditions until a homogeneous paste is obtained;

(5) pasteurizing the homogenous paste; and (6) cooling the pasteurized homogenous paste to form the solid milk product, wherein the relative amount of the aqueous liquid, the edible fat, and the concentrated milk protein source in the first blend are adjusted such that the solid milk product has a moisture level of less than about 40 percent and a fat/protein ratio of less than about 2.5 and wherein the solid milk product is a solid at ambient temperatures.

51. The method of claim 50, wherein the relative amount of the aqueous liquid, the edible fat, and the concentrated milk protein source in the first blend are adjusted such that the solid milk product has a moisture level of about 10 to about 30 percent and a fat/protein ratio of less than about 2.

52. The method of claim 50, wherein the relative amount of the aqueous liquid, the edible fat, and the concentrated milk protein source in the first blend are adjusted such that the solid milk product has a moisture level of about 10 to about 30 percent and a fat/protein ratio of about 0.5 to about 1.5.

53. The method of claim 50, wherein the aqueous liquid is selected from the group consisting of water, flavored water, fruit juice, liquid fruit concentrate, condensed milk, sweetened condensed milk, condensed fat-free milk, sweetened condensed fat-free milk, ultrafiltered milk, ultrafiltered skim milk, ultrafiltered/diafiltered milk, ultrafiltered/diafiltered skim milk, and mixtures thereof; wherein the edible fat is selected from the group consisting of butter, cream, anhydrous milkfat, vegetable fats, coco butter, and mixtures thereof; and wherein the concentrated milk protein source is selected from the group consisting of non-fat dry milk powder, milk protein concentrate, ultrafiltered milk protein concentrate, ultrafiltered/diafiltered milk protein concentrate, ultrafiltered milk protein paste, ultrafiltered/diafiltered milk protein paste, whey protein concentrate, caseinates, and mixtures thereof.

54. The method of claim 51, wherein the aqueous liquid is selected from the group consisting of water, flavored water, fruit juice, liquid fruit concentrate, condensed milk, sweetened condensed milk, condensed fat-free milk, sweetened condensed fat-free milk, ultrafiltered milk, ultrafiltered skim milk, ultrafiltered/diafiltered milk, ultrafiltered/diafiltered skim milk, and mixtures thereof; wherein the edible fat is selected from the group consisting of butter, cream, anhydrous milkfat, vegetable fats, coco butter, and mixtures thereof; and wherein the concentrated milk protein source is selected from the group consisting of non-fat dry milk powder, milk protein concentrate, ultrafiltered milk protein concentrate, ultrafiltered/diafiltered milk protein concentrate, ultrafiltered milk protein paste, ultrafiltered/diafiltered milk protein paste, whey protein concentrate, caseinates, and mixtures thereof.

55. The method of claim 50, wherein the solid milk product also contains an added sweetener at a level of up to about 35 percent.

56. The method of claim 51, wherein the solid milk product also contains an added sweetener at a level of up to about 35 percent.

57. The method of claim 53, wherein the solid milk product also contains added sucrose at a level of up to about 35 percent.

58. The method of claim 54, wherein the solid milk product also contains added sucrose at a level of up to about 35 percent.

* * * * *

UNITED STATES PATENT AND TRADEMARK OFFICE
CERTIFICATE OF CORRECTION

PATENT NO.     : 6,667,068 B2           Page 1 of 1
DATED          : December 23, 2003
INVENTOR(S)    : Smith It is certified that error appears in the above-identified patent and that said Letters Patent is hereby corrected as shown below:

<u>Title page,</u>
Item [75], Inventors, insert -- Timothy Shaun Hansen and Todd Jay Menaker, both of Chicago, IL (US) --.

<u>Column 19,</u>
Lines 6 and 21, change "coco", to -- cocoa --.

<u>Column 20,</u>
Line 57, change "added", to -- adding --.

<u>Column 23,</u>
Lines 20 and 36, change "coco", to -- cocoa --.

<u>Column 24,</u>
Lines 28 and 45, change "coco", to -- cocoa --.

Signed and Sealed this

Fourth Day of May, 2004

JON W. DUDAS
*Acting Director of the United States Patent and Trademark Office*